US012802864B2

(12) United States Patent
Okumura et al.

(10) Patent No.: US 12,802,864 B2
(45) Date of Patent: Nov. 17, 2026

(54) ELECTRONIC COMPONENT

(71) Applicant: TDK Corporation, Tokyo (JP)

(72) Inventors: Takeshi Okumura, Tokyo (JP); Kouji Kawamura, Tokyo (JP); Hidenori Tsutsui, Tokyo (JP); Yosuke Mizutani, Tokyo (JP); Hiroyuki Nishioka, Tokyo (JP)

(73) Assignee: TDK Corporation, Tokyo (JP)

( * ) Notice: Subject to any disclaimer, the term of this patent is extended or adjusted under 35 U.S.C. 154(b) by 849 days.

(21) Appl. No.: 18/160,446

(22) Filed: Jan. 27, 2023

(65) Prior Publication Data

US 2023/0245813 A1 Aug. 3, 2023

(30) Foreign Application Priority Data

Feb. 1, 2022 (JP) ................................ 2022-014216

(51) Int. Cl.
*H01F 27/29* (2006.01)
*H01F 27/06* (2006.01)
(Continued)

(52) U.S. Cl.
CPC ......... *H01F 27/2804* (2013.01); *H01F 27/06* (2013.01); *H01F 27/29* (2013.01); *H01F 41/041* (2013.01); *H01F 2027/2809* (2013.01)

(58) Field of Classification Search
CPC ...... H01F 27/2804; H01F 27/06; H01F 27/29; H01F 2027/2809; H01F 27/292;
(Continued)

(56) References Cited

U.S. PATENT DOCUMENTS

2003/0134612 A1* 7/2003 Nakayama .......... H01F 17/0013 455/306
2007/0199734 A1* 8/2007 Kudo .................. H05K 3/0052 29/25.35

(Continued)

FOREIGN PATENT DOCUMENTS

CN 104051125 A 9/2014
JP 2008-305885 A 12/2008

(Continued)

OTHER PUBLICATIONS

Office Action issued in corresponding Chinese Patent Application No. 202310049715.5 dated Sep. 4, 2026.

*Primary Examiner* — Mang Tin Bik Lian
(74) *Attorney, Agent, or Firm* — Rimon P.C.

(57) ABSTRACT

Disclosed herein is a coil component that includes conductor layers embedded in a base and terminal electrodes embedded in the base. Each of the terminal electrodes is exposed to a mounting surface of the base and a respective corner portion of the base. The conductor layers include connection patterns each connected to an associated one of the terminal electrodes. The first connection pattern is exposed to the third side surface without being exposed to the first side surface, the second connection pattern is exposed to the fourth side surface without being exposed to the first side surface, the third connection pattern is exposed to the third side surface without being exposed to the second side surface, and the fourth connection pattern is exposed to the fourth side surface without being exposed to the second side surface.

16 Claims, 6 Drawing Sheets

(51) Int. Cl.
*H01F 27/28* (2006.01)
*H01F 41/04* (2006.01)

(58) Field of Classification Search
CPC ................. H01F 17/04; H01F 17/0013; H01F 2017/0026; H01F 2017/0083; H01F 27/2852; H05K 1/181
See application file for complete search history.

(56) References Cited

U.S. PATENT DOCUMENTS

| | | | | |
|---|---|---|---|---|
| 2011/0291790 | A1* | 12/2011 | Okumura | H01F 17/0013 336/200 |
| 2013/0093556 | A1* | 4/2013 | Lim | H01F 17/0013 336/200 |
| 2013/0265131 | A1* | 10/2013 | Yang | H01F 17/0013 29/602.1 |
| 2014/0139307 | A1* | 5/2014 | Kido | H01F 27/292 29/609 |
| 2014/0145796 | A1 | 5/2014 | Okumura et al. | |
| 2014/0176279 | A1* | 6/2014 | Yang | H01F 27/29 336/192 |
| 2014/0266547 | A1* | 9/2014 | Watanabe | H01F 41/042 336/200 |
| 2015/0145629 | A1* | 5/2015 | Chang | H01F 27/292 336/192 |
| 2016/0172100 | A1* | 6/2016 | Ishida | H01F 27/245 336/192 |
| 2018/0047491 | A1* | 2/2018 | Katsuta | H01F 27/292 |
| 2018/0211754 | A1* | 7/2018 | Hattori | H01F 17/0013 |
| 2018/0286558 | A1* | 10/2018 | Yokoyama | H01F 27/2804 |
| 2019/0035527 | A1* | 1/2019 | Okura | H01F 17/0013 |
| 2022/0367603 | A1* | 11/2022 | Tanaka | H10D 1/20 |

FOREIGN PATENT DOCUMENTS

| | | | |
|---|---|---|---|
| JP | 2014-179453 | A | 9/2014 |
| JP | 2014-229739 | A | 12/2014 |
| JP | 6024418 | B2 | 11/2016 |

* cited by examiner

ELECTRONIC COMPONENT

BACKGROUND OF THE ART

Field of the Art

The present disclosure relates to an electronic component and, more particularly, to a chip-type electronic component to be surface-mounted.

Description of Related Art

Japanese Patent No. 6,024,418 discloses a surface-mount electronic component having a structure in which terminal electrodes are disposed respectively at four corner portions of a base. In the electronic component disclosed in Japanese Patent No. 6,024,418, a plurality of conductor layers stacked through insulating layers are partly exposed from the base, and the exposed parts each also function as a part of the terminal electrode.

An electronic component having a very small size may experience a failure of rotating by 90° (chip standing, or Manhattan phenomenon) at mounting to a circuit board due to surface tension of a solder melted during reflow. Such a phenomenon is conspicuous when the height of an electronic component is ⅔ or more of the width of the electronic component in the short side direction, and the electronic component is likely to rotate about the long-side direction thereof.

SUMMARY

It is therefore an object of the present disclosure to prevent the rotation phenomenon of a surface-mount electronic component at the time of mounting thereof.

An electronic component according to the present disclosure includes: a base; a plurality of conductor layers embedded in the base and stacked in a first direction with insulating layers each interposed therebetween; and first to fourth terminal electrodes embedded in the base. The base has a mounting surface perpendicular to the first direction, first and second side surfaces each extending in the first direction and in a second direction perpendicular to the first direction and positioned on the mutually opposite sides, and third and fourth side surfaces each extending in the first direction and in a third direction perpendicular to the first and second directions and positioned on the mutually opposite sides. The length of the base in the second direction is longer than the width of the base in the third direction. The first terminal electrode is exposed to the mounting surface and a corner portion between the first and third side surfaces, the second terminal electrode is exposed to the mounting surface and a corner portion between the first and fourth side surfaces, the third terminal electrode is exposed to the mounting surface and a corner portion between the second and third side surfaces, and the fourth terminal electrode is exposed to the mounting surface and a corner portion between the second and fourth side surfaces. The plurality of conductor layers include a first connection pattern connected to the first terminal electrode, a second connection pattern connected to the second terminal electrode, a third connection pattern connected to the third terminal electrode, and a fourth connection pattern connected to the fourth terminal electrode. The first connection pattern is exposed to the third side surface without being exposed to the first side surface, the second connection pattern is exposed to the fourth side surface without being exposed to the first side surface, the third connection pattern is exposed to the third side surface without being exposed to the second side surface, and the fourth connection pattern is exposed to the fourth side surface without being exposed to the second side surface.

BRIEF DESCRIPTION OF THE DRAWINGS

The above and other objects, features and advantages of this disclosure will become more apparent by reference to the following detailed description of the disclosure taken in conjunction with the accompanying drawings, wherein.

DETAILED DESCRIPTION OF THE EMBODIMENTS

Preferred embodiments of the present disclosure will now be explained in detail with reference to the drawings.

Figure 1:
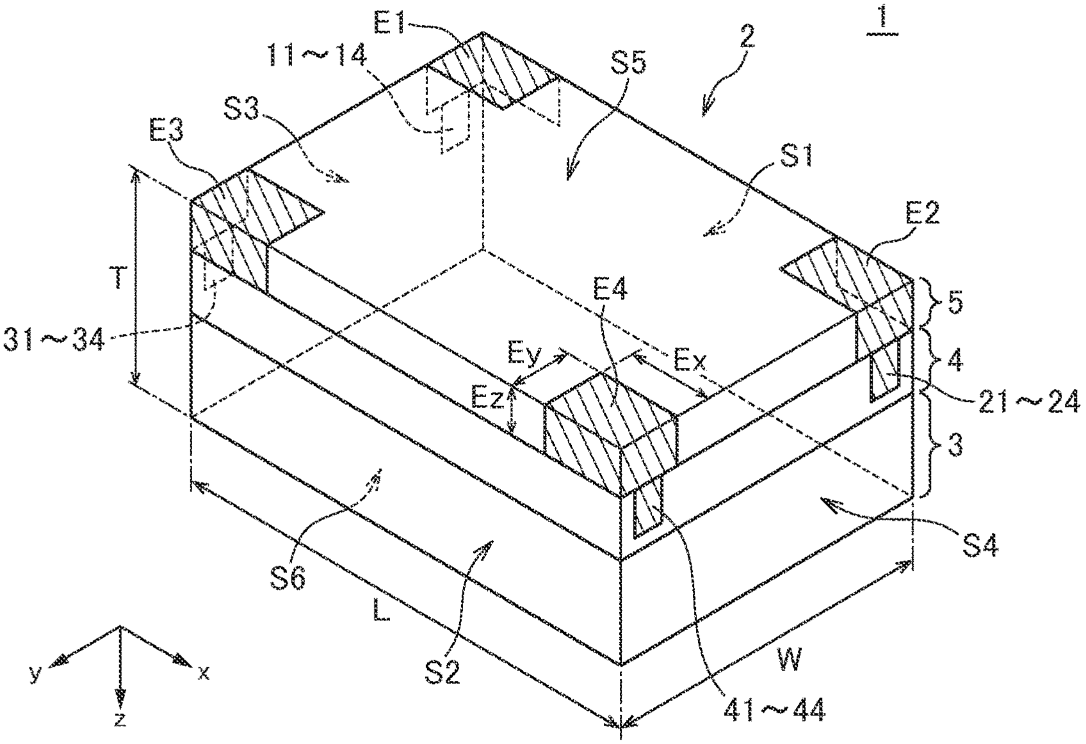
FIG. 1 is a schematic perspective view illustrating the outer appearance of an electronic component 1 according to an embodiment of the present disclosure.

FIG. 1 is a schematic perspective view illustrating the outer appearance of an electronic component 1 according to an embodiment of the present disclosure.

The electronic component 1 according to the present embodiment is a surface-mount common mode filter and includes a base 2 and four termina electrodes E1 to E4 embedded in the base 2, as illustrated in FIG. 1. The base 2 has a support 3 made of a high permeability material such as ferrite, a functional layer stacked on the support 3, and a magnetic material layer 5 stacked on the functional layer 4. The functional layer 4 has a structure in which insulating layers and conductor layers are alternately stacked in the z-direction, and the conductor layers each have a coil pattern to be described later. The magnetic material layer 5 may be made of a composite magnetic material obtained by mixing magnetic powder (ferrite, permalloy, etc.) and resin. The terminal electrodes E1 to E4 are embedded in the magnetic material layer 5, and the surfaces thereof are partly exposed from the base 2.

The base 2 has a substantially rectangular parallelepiped shape and has a mounting surface S5 and a top surface S6 which constitute the xy surface and are positioned on the mutually opposite sides, side surfaces S1 and S2 constituting the xz surface and positioned on the mutually opposite sides, and side surfaces S3 and S4 constituting the yz surface and positioned on the mutually opposite sides. The mounting surface S5 and top surface S6 are perpendicular to the z-direction (stacking direction). Assuming that the length of the base 2 in the x-direction is L and that the width thereof in the y-direction is W, L>W is satisfied. That is, the long-side direction of the base 2 is the x-direction as viewed in the z-direction, and the short-side direction thereof is the y-direction. Thus, the electronic component 1 is likely to rotate about the x-direction at the time of mounting. Further, assuming that the height of the base 2 in the z-direction is T, L>T and T/W≥⅔ are satisfied. That is, the yz cross section of the base 2 is relatively close to a square, so that the electronic component 1 has a condition under which it is likely to rotate about the x-direction. In particular, When T≥W is satisfied, rotation about the x-direction is more likely to occur.

As illustrated in FIG. 1, the terminal electrode E1 is exposed to the mounting surface S5 and the corner portion between the side surfaces S1 and S3. The terminal electrode E2 is exposed to the mounting surface S5 and the corner portion between the side surfaces S1 and S4. The terminal electrode E3 is exposed to the mounting surface S5 and the corner portion between the side surfaces S2 and S3. The terminal electrode E4 is exposed to the mounting surface S5 and the corner portion between the side surfaces S2 and S4. Assuming that the x-direction length of the terminal electrodes E1 to E4 exposed to the mounting surface S5 or side surface (S1 or S2) is Ex, the y-direction width of the terminal electrodes E1 to E4 exposed to the mounting surface S5 or side surface (S3 or S4) is Ey, and the z-direction height of the terminal electrodes E1 to E4 exposed to the side surface (S1, S2, S3, or S4) is Ez, Ex>Ey>Ez is satisfied. Thus, in each of the terminal electrodes E1 to E4, the area (=Ex×Ey) of a part exposed to the mounting surface S5 is the largest, the area (=Ex×Ez) of a part exposed to the side surface S1 or S2 is the second largest, and the area (=Ey×Ez) of a part exposed to the side surface S3 or S4 is the smallest. For example, Ex=2×Ey, and Ex=2.5×Ez. As described above, in each of the terminal electrodes E1 to E4, the area of a part exposed to the mounting surface S5 is larger than the area of a part exposed to the side surface S1 or S2, so that rotation about the x-direction can be suppressed in a state where the electronic component 1 is mounted on a circuit board.

Further, connection patterns included in the functional layer 4 are exposed from the side surfaces S3 and S4. Specifically, connection patterns 11 to 14 are exposed to the side surface S3 and connected to the terminal electrode E1, connection patterns 21 to 24 are exposed to the side surface S4 and connected to the terminal electrode E2, connection patterns 31 to 34 are exposed to the side surface S3 and connected to the terminal electrode E3, and connection patterns 41 to 44 are exposed to the side surface S4 and connected to the terminal electrode E4. The connection patterns 11 to 14, 21 to 24, 31 to 34, and 41 to 44 are exposed from only the side surface S3 or S4 and not exposed from the side surface S1 or S2. Thus, the entire surface of the functional layer 4 that is exposed to each of the side surfaces S1 and S2 is formed of the insulating layer. That is, in the functional layer 4, the conductor pattern to be connected to each of the terminal electrodes E1 to E4 is not exposed from the side surfaces S1 and S2.

Figure 2:
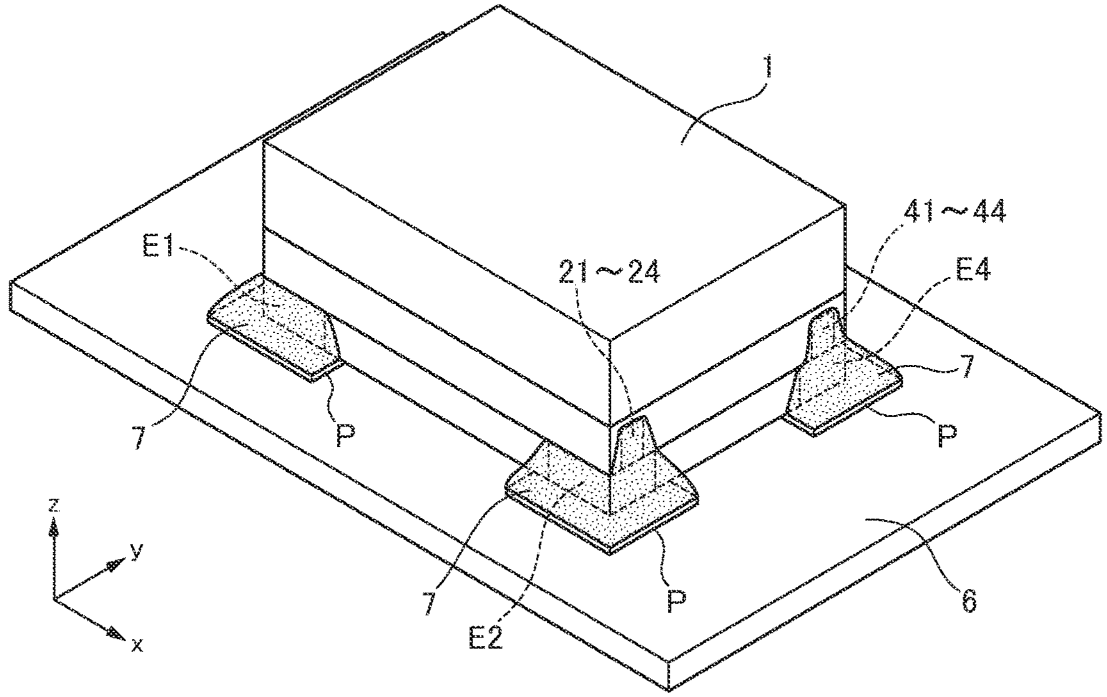
FIG. 2 is a schematic perspective view illustrating a state where the electronic component 1 is mounted on a circuit board 6.

FIG. 2 is a schematic perspective view illustrating a state where the electronic component 1 according to the present embodiment is mounted on a circuit board 6.

As illustrated in FIG. 2, the circuit board 6 has land patterns P corresponding respectively to the terminal electrodes E1 to E4. The land patterns P and terminal electrodes E1 to E4 are connected through a solder 7. The solder 7 forms a filet at a part of the surface of the base 2 that has wettability, that is, at the terminal electrodes E1 to E4 and connection patterns 11 to 14, 21 to 24, 31 to 34, and 41 to 44. Thus, on the side surfaces S1 and S1 of the base 2, the fillet of the solder 7 is formed with respect only to the terminal electrodes E1 to E4, while on the side surfaces S3 and S4 of the base 2, the fillet of the solder 7 is formed with respect not only to the terminal electrodes E1 to E4 but also to the connection patters 11 to 14, 21 to 24, 31 to 34, and 41 to 44.

As a result, when solder reflow is performed after the electronic component 1 is mounted on the circuit board 6, the fillet of the solder 7 formed on the side surfaces S1 and S2 of the base 2 acts so as to rotate the electronic component 1 about the long side direction (x-direction) due to surface tension. When the amount of the solder 7 formed on the side surface S1 and the amount of solders formed on the side surface S2 are substantially equal to each other, surface tension acting on the side surface S1 and surface tension acting on the side surface S2 are substantially balanced, the electronic component 1 does not rotate. However, when there is a difference between the amount of the solder 7 formed on the side surface S1 and the amount of solders formed on the side surface S2, there occurs a difference between surface tension acting on the side surface S1 and surface tension acting on the side surface S2, which may cause the electronic component 1 to rotate by 90° about the x-direction.

However, in the present embodiment, the connection pattern (11 to 14, 21 to 24, 31 to 34, and 41 to 44) is not exposed to the side surfaces S1 and S2 of the base 2, so that the z-direction height of the fillet formed on the side surfaces S1 and S2 of the base 2 can be reduced, whereby a force to rotate the electronic component 1 in the x-direction can be reduced. In addition, the connection pattern (11 to 14, 21 to 24, 31 to 34, and 41 to 44) is exposed to the side surfaces S3 and S4 of the base 2, so that a sufficient z-direction height of the fillet formed on the surfaces S3 and S4 of the base 2 is provided, whereby rotation of the electronic component 1 about the x-direction can be suppressed by the fillet formed on the side surfaces S3 and S4 of the base 2. Since the y-direction is the short side direction, rotation of the electronic component 1 about the y-direction is ignorable.

As described above, in the electronic component 1 according to the present embodiment, the connection pattern (11 to 14, 21 to 24, 31 to 34, and 41 to 44) is not exposed to the side surfaces S1 and S2 extending in the long side direction but exposed to the side surfaces S3 and S4 extending in the short side direction, so that a phenomenon that the electronic component 1 rotates by 90° about the x-direction can be prevented by surface tension of the solder 7 melted during reflow. In addition, the terminal electrodes E1 to E4 are formed at the respective corners of the base 2, so that sufficient connection reliability to the land patterns P can be ensured.

The following describes the configurations of respective layers constituting the functional layer 4.

Figure 3:
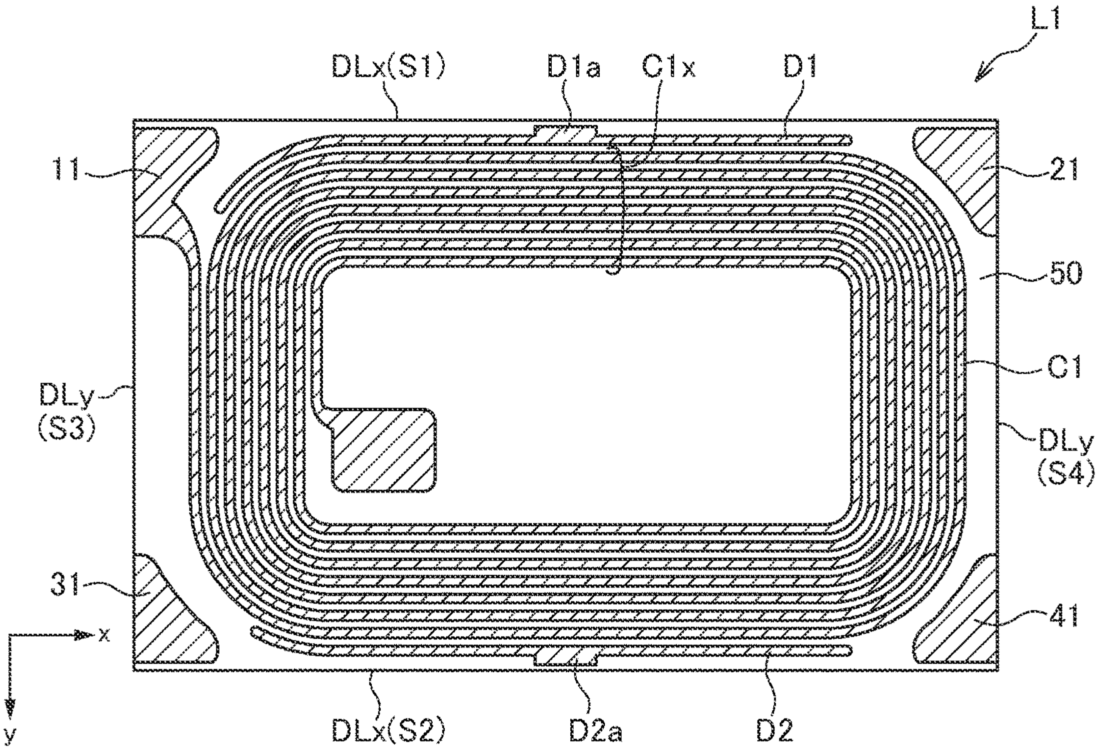
FIG. 3 is a schematic plan view for explaining a pattern shape of a conductor layer L1.

The functional layer 4 has a structure in which insulating layers 50, 60, 70, 80, and 90 and conductor layers L1 to L4 illustrated in FIGS. 3 to 10 are alternately stacked on the surface of the support 3. As illustrated in FIG. 3, the insulating layer 50 is a layer covering the xy surface of the support 3, and the conductor layer L1 is formed on the surface of the insulating layer 50. The conductor layer L1 has a spirally wound coil pattern C1, connection patterns 11, 21, 31, and 41, and dummy patterns D1 and D2. The outer peripheral end of the coil pattern C1 is connected to the connection pattern 11. Other connection patterns 21, 31, and 41 are not connected to the coil pattern C1 but are each provided as an independent conductor pattern within the surface of the conductor layer L1.

The dummy patterns D1 and D2 are each also provided as an independent conductor pattern within the surface of the conductor layer L1 and are provided at the outer periphery of the coil pattern C1. The dummy pattern D1 is disposed between the outermost turn of the coil pattern C1 and the side surface S1 so as to extend in the x-direction along the outermost turn of the coil pattern C1. The dummy pattern D2 is disposed between the outermost turn of the coil pattern C1 and the side surface S2 so as to extend in the x-direction along the outermost turn of the coil pattern C1. The side surfaces S1 and S2 are each defined by a dicing line DLx. As illustrated in FIG. 3, the dummy patterns D1 and D2 have protruding parts D1*a* and D2*a*, respectively. The protruding part D1*a* protrudes in the y-direction from the main part of the dummy pattern D1 toward the side surface S1, and the protruding part D2*a* protrudes in the y-direction from the main part of the dummy pattern D2 toward the side surface S2. The end position of the protruding part D1*a* in the y-direction is slightly outside the end position of each of the connection patterns 11 and 21 in the y-direction. Similarly, the end position of the protruding part D2*a* in the y-direction is slightly outside the end position of each of the connection patterns 31 and 41 in the y-direction. That is, a distance between the protruding part D1*a* and the side surface S1 of the base 2 in the y-direction is smaller than a distance between each of the connection patterns 11, 21 and the side surface S1 of the base 2 in the y-direction, and a distance between the protruding part D2*a* and the side surface S2 of the base 2 in the y-direction is smaller than a distance between each of the connection patterns 31, 41 and the side surface S2 of the base 2 in the y-direction.

Figure 4:
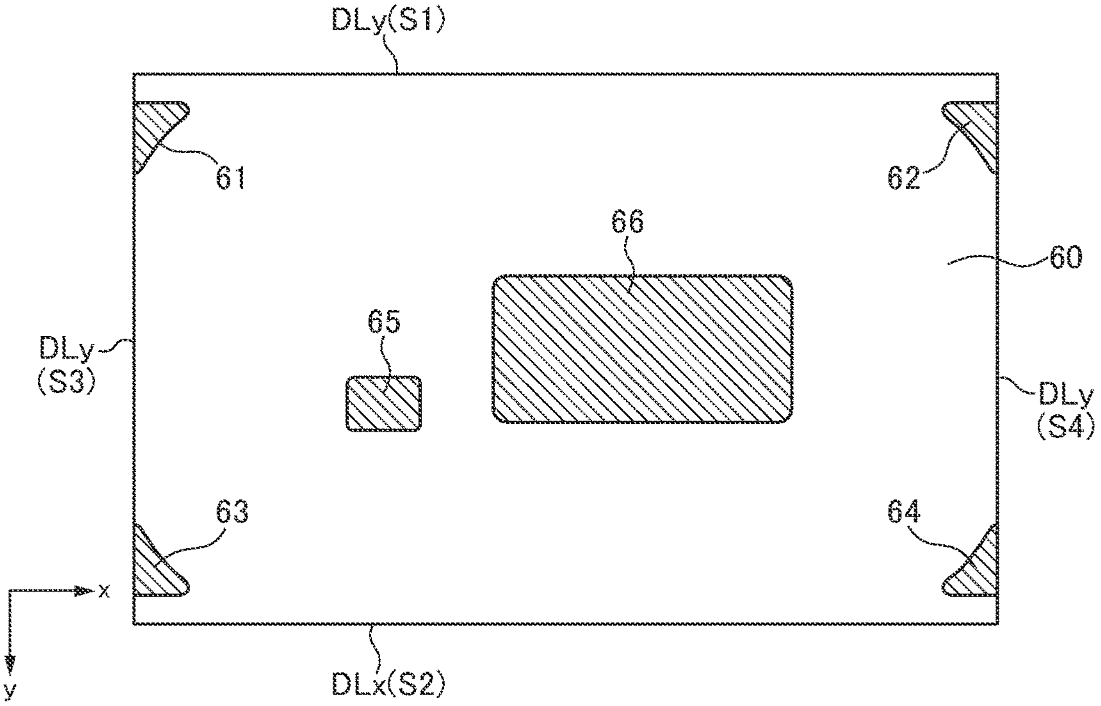
FIG. 4 is a schematic plan view for explaining a pattern shape of a insulating layer 60.

The conductor layer L1 is covered with the insulating layer 60 illustrated in FIG. 4. The insulating layer 60 has openings 61 to 66. The openings 61, 62, 63, and 64 are formed at positions overlapping the connection patterns 11, 21, 31, and 41, respectively. The opening 65 is formed at a position overlapping the inner peripheral end of the coil pattern C1. The opening 66 is formed at a position overlapping the inner diameter area surrounded by the coil pattern C1.

Figure 5:
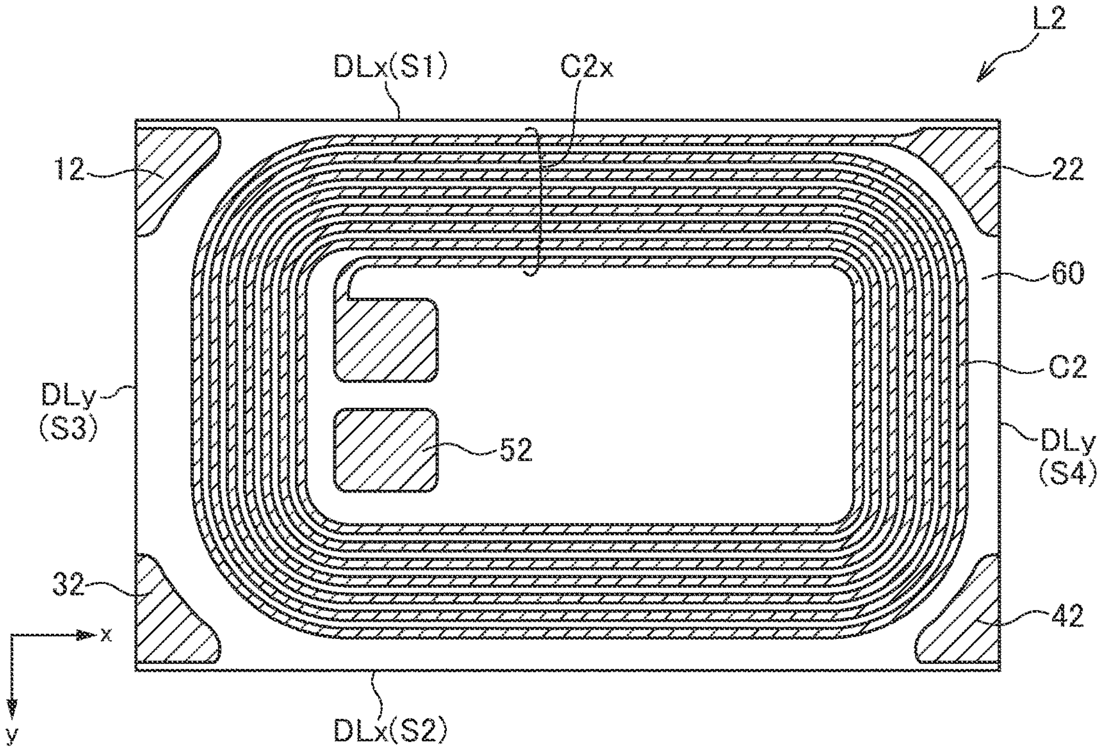
FIG. 5 is a schematic plan view for explaining a pattern shape of a conductor layer L2.

The conductor layer L2 illustrated in FIG. 5 is formed on the surface of the insulating layer 60. The conductor layer L2 has a spirally wound coil pattern C2, connection patterns 12, 22, 32, and 42, and a relay pattern 52. The outer peripheral end of the coil pattern C2 is connected to the connection pattern 22. Other connection patterns 12, 32, and 42 and relay pattern 52 are not connected to the coil pattern C2 but are each provided as an independent conductor pattern within the surface of the conductor layer L2. The connection patterns 12, 22, 32, and 42 are connected to the connection patterns 11, 21, 31, and 41 of the conductor layer L1, respectively, through the respectively corresponding openings 61, 62, 63, and 64 formed in the insulating layer 60. The relay pattern 52 is connected to the inner peripheral end of the coil pattern C1 through the opening 65 formed in the insulating layer 60. The number of turns at a section C2*x* of the coil pattern C2 that extends in the x-direction is eight, while the number of turns at a section C1*x* of the coil pattern C1 that extends in the x-direction is seven, so that a level difference may be generated at the outermost turn of the section C2*x*. However, in the present embodiment, the dummy pattern D1 is disposed at a position overlapping the outermost turn of the section C2*x*, making such a level difference less likely to be generated.

Figure 6:
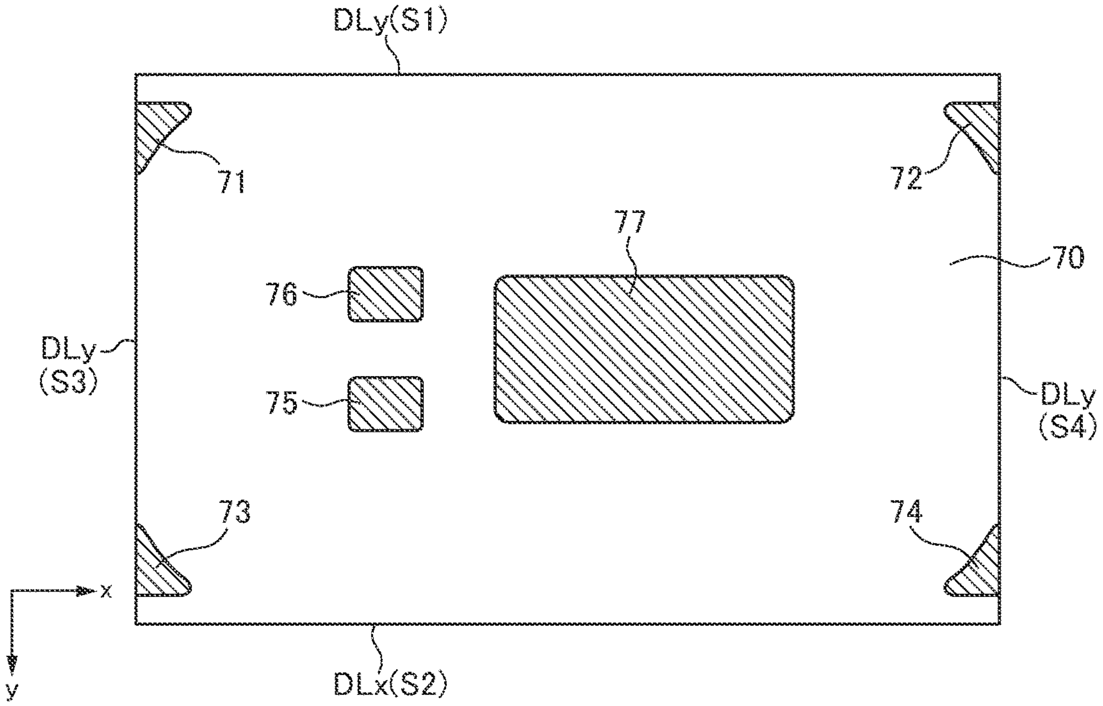
FIG. 6 is a schematic plan view for explaining a pattern shape of a insulating layer 70.

The conductor layer L2 is covered with the insulating layer 70 illustrated in FIG. 6. The insulating layer 70 has openings 71 to 77. The openings 71, 72, 73, and 74 are formed at positions overlapping the connection patterns 12, 22, 32, and 42, respectively. The opening 75 is formed at a position overlapping the relay pattern 52. The opening 76 is formed at a position overlapping the inner peripheral end of the coil pattern C2. The opening 77 is formed at a position overlapping the opening 66.

Figure 7:
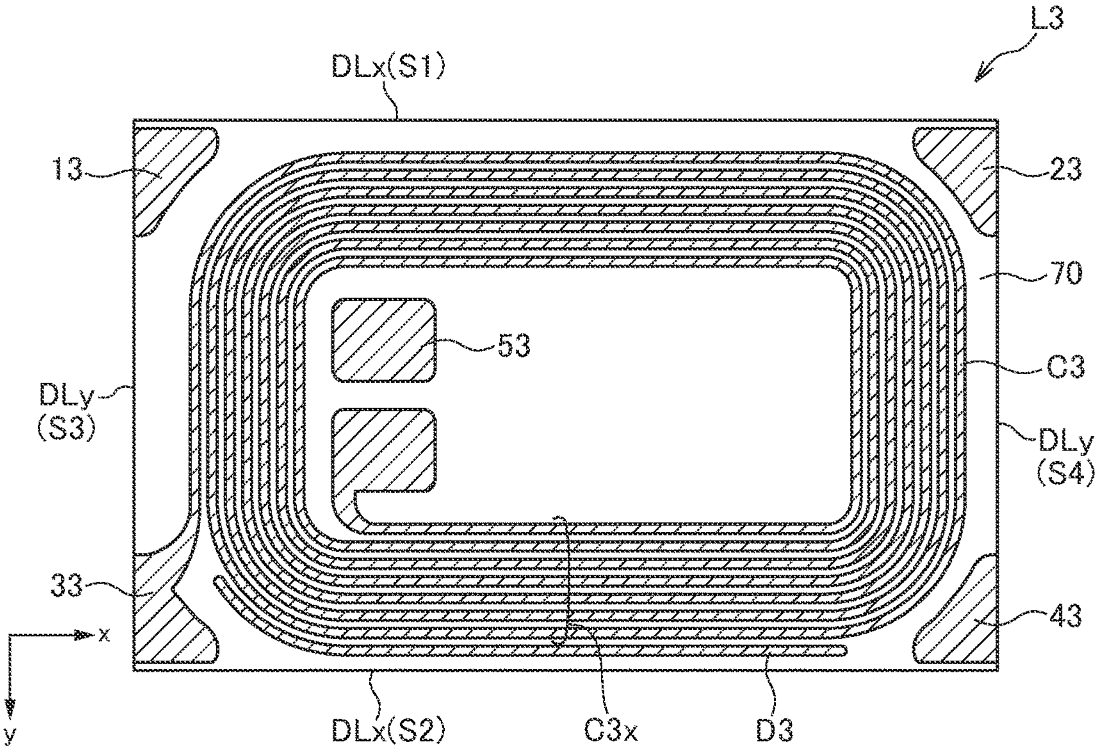
FIG. 7 is a schematic plan view for explaining a pattern shape of a conductor layer L3.

The conductor layer L3 illustrated in FIG. 7 is formed on the surface of the insulating layer 70. The conductor layer L3 has a spirally wound coil pattern C3, connection patterns 13, 23, 33, and 43, a relay pattern 53, and a dummy pattern D3. The outer peripheral end of the coil pattern C3 is connected to the connection pattern 33. Other connection patterns 13, 23, and 43, relay pattern 53, and dummy pattern D3 are not connected to the coil pattern C3 but are each provided as an independent conductor pattern within the surface of the conductor layer L3. The connection patterns 13, 23, 33, and 43 are connected to the connection patterns 12, 22, 32, and 42, respectively, through the respectively corresponding openings 71, 72, 73, and 74 formed in the insulating layer 70. The inner peripheral end of the coil pattern C3 is connected to the relay pattern 52 through the opening 75. As a result, the inner peripheral end of the coil pattern C3 and the inner peripheral end of the coil pattern C1 are connected to each other through the relay pattern 52. The relay pattern 53 is connected to the inner peripheral end of the coil pattern C2 through the opening 76 formed in the insulating layer 70.

Figure 8:
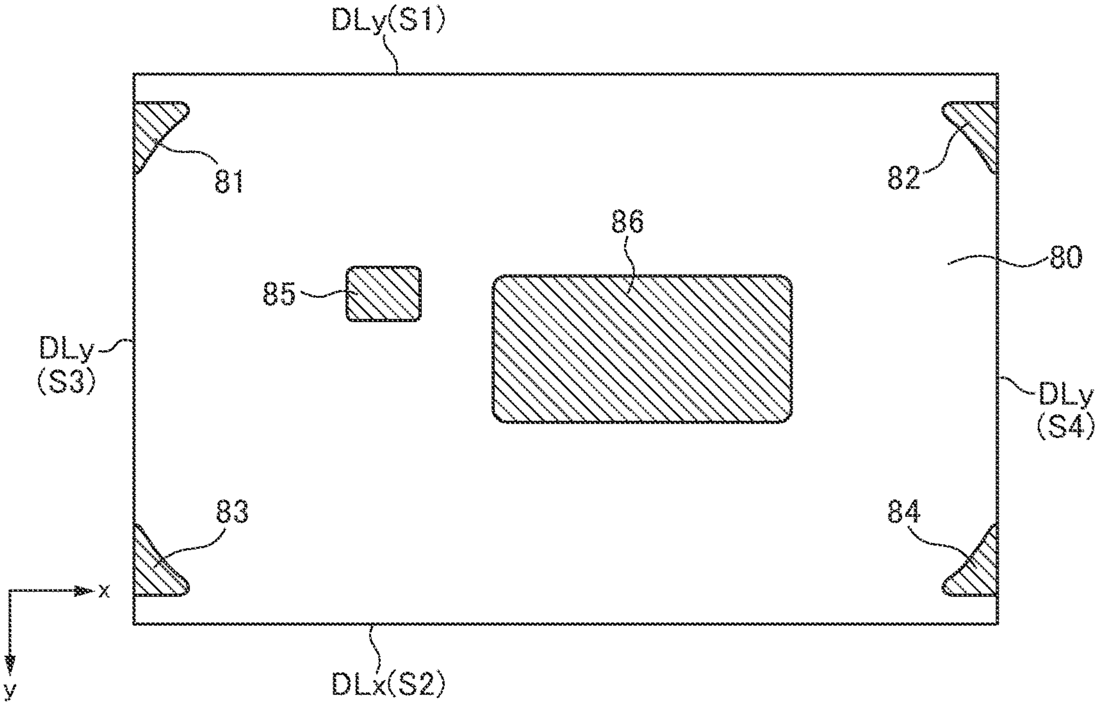
FIG. 8 is a schematic plan view for explaining a pattern shape of a insulating layer 80.

The conductor layer L3 is covered with the insulating layer 80 illustrated in FIG. 8. The insulating layer 80 has openings 81 to 86. The openings 81, 82, 83, and 84 are formed at positions overlapping the connection patterns 13, 23, 33, and 43, respectively. The opening 85 is formed at a position overlapping the relay pattern 53. The opening 86 is formed at a position overlapping the openings 77 and 66.

Figure 9:
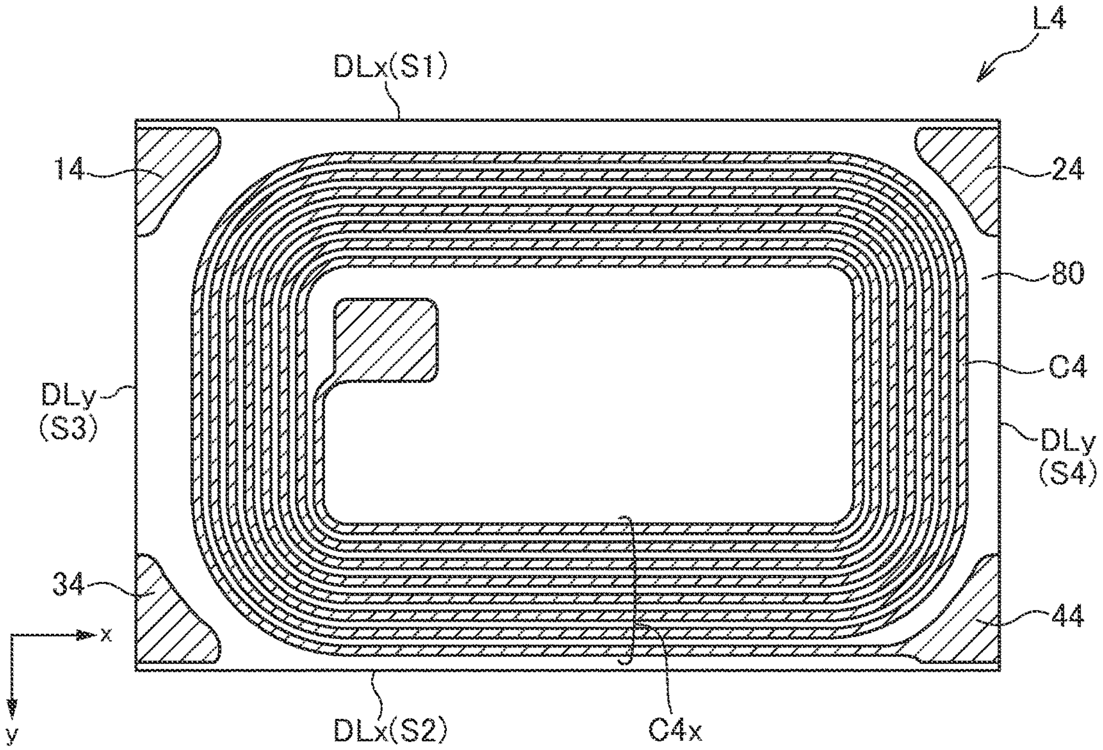
FIG. 9 is a schematic plan view for explaining a pattern shape of a conductor layer L4.

The conductor layer L4 illustrated in FIG. 9 is formed on the surface of the insulating layer 80. The conductor layer L4 has a spirally wound coil pattern C4, and connection patterns 14, 24, 34, and 44. The outer peripheral end of the coil pattern C4 is connected to the connection pattern 44. Other connection patterns 14, 24, and 34 are not connected to the coil pattern C4 but are each provided as an independent conductor pattern within the surface of the conductor layer L4. The connection patterns 14, 24, 34, and 44 are connected to the connection patterns 13, 23, 33, and 43 of the conductor layer L3, respectively, through the openings 81 to 84 formed in the insulating layer 80. The inner peripheral end of the coil pattern C4 is connected to the relay pattern 53 through the opening 85. As a result, the inner peripheral end of the coil pattern C4 and the inner peripheral end of the coil pattern C2 are connected to each other through the relay pattern 53. The number of turns at a section C4*x* of the coil pattern C4 that extends in the x-direction is eight, while the number of turns at a section C3*x* of the coil pattern C3 that extends in the x-direction is seven, so that a level difference may be generated at the outermost turn of the section C4*x*. However, in the present embodiment, the dummy pattern D3 is disposed at a position overlapping the outermost turn of the section C4*x*, making such a level difference less likely to be generated.

Figure 10:
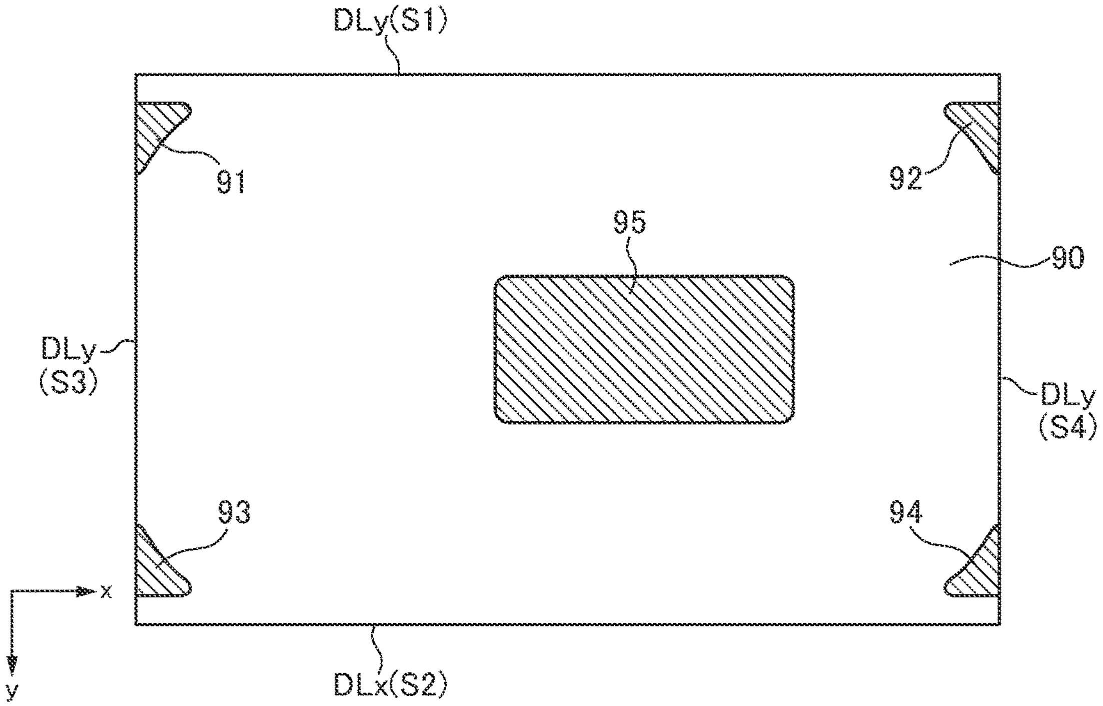
FIG. 10 is a schematic plan view for explaining a pattern shape of a insulating layer 90.

The conductor layer L4 is covered with the insulating layer 90 illustrated in FIG. 10. The insulating layer 90 has openings 91 to 95. The openings 91, 92, 93, and 94 are formed at positions overlapping the connection patterns 14, 24, 34, and 44, respectively. The opening 95 is formed at a position overlapping the openings, 86, 77, and 66.

Figure 11:
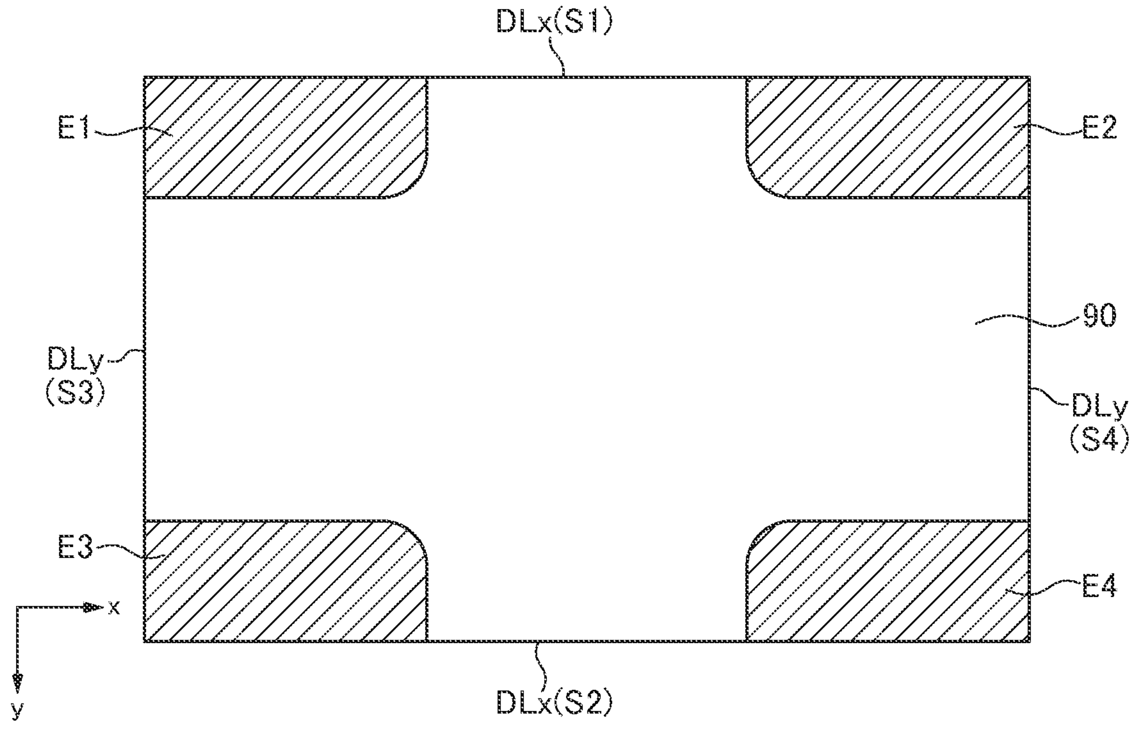
FIG. 11 is a schematic plan view for explaining a pattern shape of terminal electrodes E1 to E4.

The terminal electrodes E1 to E4 illustrated in FIG. 11 is formed on the surface of the insulating layer 90. The terminal electrodes E1, E2, E3, and E4 are connected to the connection patterns 14, 24, 34, and 44 of the conductor layer L4, respectively, through the respectively corresponding openings 91, 92, 93, and 94. As a result, the coil patterns C1 and C3 are connected in series between the terminal electrodes E1 and E3, and the coil patterns C2 and C4 are connected in series between the terminal electrodes E2 and E4. Since the coil patterns C1 to C4 are stacked in this order in the z-direction, strong magnetic coupling can be achieved between an inductor constituted by the coil patterns C1 and C3 and an inductor constituted by the coil patterns C2 and C4.

The magnetic material layer 5 illustrated in FIG. 1 is formed on a part of the surface of the insulating layer 90 at which the terminal electrodes E1 to E4 are not formed. A part of the magnetic material layer 5 is filled in the openings 95, 86, 77, and 66 to serve as a magnetic path in the inner diameter area of the coil patterns C1 to C4.

In manufacturing the electronic component 1, an aggregate substrate is used to obtain multiple electronic components 1. Specifically, the aggregate substrate is cut in the x- and y-directions along dicing lines DLx and DLy illustrated in FIGS. 3 to 11 to singulate the electronic components 1. As illustrated in FIGS. 3 to 11, the y-direction position of the dicing line DLx extending in the x-direction is outside the connection patterns 11 to 14, 21 to 24, 31 to 34, and 41 to 44, whereby the connection patterns 11 to 14, 21 to 24, 31 to 34, and 41 to 44 are not exposed from the side surfaces S1 and S2 of the base 2. On the other hand, the x-direction position of the dicing line DLy extending in the y-direction overlaps the connection patterns 11 to 14, 21 to 24, 31 to 34, and 41 to 44, whereby the connection patterns 11 to 14, 21 to 24, 31 to 34, and 41 to 44 are exposed from the side surface S3 or S4 of the base 2.

The dicing position is properly controlled by referring to a not-shown alignment mark; however, some misalignment inevitably occurs due to manufacturing error. When the dicing line DLx is significantly displaced in the y-direction, the connection patterns 11 to 14 and 21 to 24 may be exposed from the side surface S1 of the base 2, or the connection patterns 31 to 34 and 41 to 44 may be exposed from the side surface S2 of the base 2. However, in the present embodiment, the protruding part D1*a* of the dummy pattern D1 is positioned outside the connection patterns 11 to 14 and 21 to 24, and the protruding part D2*a* of the dummy pattern D2 is positioned outside the connection patterns 31 to 34 and 41 to 44. Thus, before the connection patterns 11 to 14 and 21 to 24 or the connection patterns 31 to 34 and 41 to 44 are exposed from the side surface S1 or S2 of the base 2 due to displacement of the dicing line DLx in the y-direction, the y-direction displacement of the dicing line DLx can be detected by the exposition of the protruding part D1*a* or D2*a*. Thus, even when the protruding part D1*a* or D2*a* is exposed, it is possible to prevent the connection patterns 11 to 14, 21 to 24, 31 to 34, and 41 to 44 from being exposed from the side surface S1 or S2 by readjusting the y-direction position of the dicing line DLx in the subsequent manufacturing lots. The dummy patterns D1 and D2 are each an independent conductor pattern and are each in an electrically floating state, so that even when the protruding part D1*a* or D2*a* is exposed, desired characteristics can be obtained.

While the preferred embodiment of the present disclosure has been described, the present disclosure is not limited to the above embodiment, and various modifications may be made within the scope of the present disclosure, and all such modifications are included in the present disclosure.

For example, although a common mode filter is used as the electronic component 1 in the above embodiment, the present invention is not limited to this, and any kind of electronic component may be used as long as it is a chip-type electronic component to be surface-mounted on a circuit board.

The technology according to the present disclosure includes the following configuration examples but not limited thereto.

An electronic component according to the present disclosure includes: a base; a plurality of conductor layers embedded in the base and stacked in a first direction with insulating layers each interposed therebetween; and first to fourth terminal electrodes embedded in the base. The base has a mounting surface perpendicular to the first direction, first and second side surfaces each extending in the first direction and in a second direction perpendicular to the first direction and positioned on the mutually opposite sides, and third and fourth side surfaces each extending in the first direction and in a third direction perpendicular to the first and second directions and positioned on the mutually opposite sides. The length of the base in the second direction is longer than the width of the base in the third direction. The first terminal electrode is exposed to the mounting surface and a corner portion between the first and third side surfaces, the second terminal electrode is exposed to the mounting surface and a corner portion between the first and fourth side surfaces, the third terminal electrode is exposed to the mounting surface and a corner portion between the second and third side surfaces, and the fourth terminal electrode is exposed to the mounting surface and a corner portion between the second and fourth side surfaces. The plurality of conductor layers include a first connection pattern connected to the first terminal electrode, a second connection pattern connected to the second terminal electrode, a third connection pattern connected to the third terminal electrode, and a fourth connection pattern connected to the fourth terminal electrode. The first connection pattern is exposed to the third side surface without being exposed to the first side surface, the second connection pattern is exposed to the fourth side surface without being exposed to the first side surface, the third connection pattern is exposed to the third side surface without being exposed to the second side surface, and the fourth connection pattern is exposed to the fourth side surface without being exposed to the second side surface.

According to the present disclosure, the first to fourth connection patterns are exposed to the third or fourth side surface without being exposed to the first and second side surfaces, so that it is possible to increase the surface tension of a solder acting the third and fourth side surfaces extending in the short side direction while reducing the surface tension of a solder acting on the first and second side surfaces extending in the long side direction. This makes rotation of the electronic component about the long side direction less likely to occur at the time of mounting.

In the present disclosure, the height of the base in the first direction may be ⅔ or more of the width of the base in the third direction, which makes the electronic component likely to rotate about the long side direction; however, even in this case, it is possible to prevent rotation of the electronic component about the long side direction.

In the present disclosure, a part of each of the first to fourth terminal electrodes that is exposed to the mounting surface may be larger in area than a part of each of the first to fourth terminal electrodes that is exposed to the first or second side surface. This increases the surface tension of a solder acting on the mounting surface, making rotation of the electronic component still less likely to occur at the time of mounting.

In the present disclosure, one of the plurality of conductor layers may further includes a spirally wound coil patter and a dummy pattern provided at the outer periphery of the coil pattern. This makes it possible to enhance flatness of each conductor layer. In this case, the dummy pattern may have a protruding part protruding toward the first side surface side. This facilitates detection of displacement of a dicing position. Further, in this case, a distance between the protruding part and the first side surface may be smaller than a distance between each of the first and second connection patterns and the first side surface. This makes it possible to detect displacement of a dicing position before the first and second connection patterns are exposed to the first side surface.

As described above, according to the present disclosure, it is possible to prevent the rotation phenomenon of a surface-mount electronic component at the time of mounting thereof.

What is claimed is:

1. An electronic component comprising:

a base having a functional layer and a magnetic material layer stacked on the functional layer in a first direction;

a plurality of conductor layers embedded in the functional layer of the base and stacked in the first direction with insulating layers each interposed therebetween; and first to fourth terminal electrodes embedded in the magnetic material layer of the base, wherein the base has:

a mounting surface perpendicular to the first direction;

first and second side surfaces each extending in the first direction and in a second direction perpendicular to the first direction and positioned on mutually opposite sides; and third and fourth side surfaces each extending in the first direction and in a third direction perpendicular to the first and second directions and positioned on mutually opposite sides, wherein a length of the base in the second direction is longer than a width of the base in the third direction, wherein the first terminal electrode is exposed to the mounting surface and a corner portion between the first and third side surfaces in the magnetic material layer, wherein the second terminal electrode is exposed to the mounting surface and a corner portion between the first and fourth side surfaces in the magnetic material layer, wherein the third terminal electrode is exposed to the mounting surface and a corner portion between the second and third side surfaces in the magnetic material layer, wherein the fourth terminal electrode is exposed to the mounting surface and a corner portion between the second and fourth side surfaces in the magnetic material layer, wherein the plurality of conductor layers include:

a first connection pattern connected to the first terminal electrode;

a second connection pattern connected to the second terminal electrode;

a third connection pattern connected to the third terminal electrode; and a fourth connection pattern connected to the fourth terminal electrode, wherein the first connection pattern is exposed to the third side surface without being exposed to the first side surface in the functional layer, wherein the second connection pattern is exposed to the fourth side surface without being exposed to the first side surface in the functional layer, wherein the third connection pattern is exposed to the third side surface without being exposed to the second side surface in the functional layer, wherein the fourth connection pattern is exposed to the fourth side surface without being exposed to the second side surface in the functional layer, and wherein each of the first and second side surfaces in the functional layer is free from the plurality of conductor layers, wherein a width in the third direction of the first connection pattern exposed to the third side surface is smaller than a width in the third direction of the first terminal electrode exposed to the third side surface, wherein a width in the third direction of the second connection pattern exposed to the fourth side surface is smaller than a width in the third direction of the second terminal electrode exposed to the fourth side surface, wherein a width in the third direction of the third connection pattern exposed to the third side surface is smaller than a width in the third direction of the third terminal electrode exposed to the third side surface, and wherein a width in the third direction of the fourth connection pattern exposed to the fourth side surface is smaller than a width in the third direction of the fourth terminal electrode exposed to the fourth side surface.

2. The electronic component as claimed in claim 1, wherein a height of the base in the first direction is ⅔ or more of the width of the base in the third direction.

3. The electronic component as claimed in claim 1, wherein a part of each of the first to fourth terminal electrodes that is exposed to the mounting surface is larger in area than a part of each of the first to fourth terminal electrodes that is exposed to the first or second side surface.

4. The electronic component as claimed in claim 1, wherein one of the plurality of conductor layers includes a spirally wound coil pattern and a dummy pattern provided at an outer periphery of the coil pattern.

5. The electronic component as claimed in claim 4, wherein the dummy pattern has a protruding part protruding toward the first side surface side.

6. The electronic component as claimed in claim 5, wherein a distance between the protruding part and the first side surface is smaller than a distance between each of the first and second connection patterns and the first side surface.

7. An electronic component comprising:

a base;

a plurality of conductor layers embedded in the base and stacked in a first direction with insulating layers each interposed therebetween; and first to fourth terminal electrodes embedded in the base, wherein the plurality of conductor layers include first, second, third, and fourth conductor layers stacked in the first direction in this order, wherein the base has:

a mounting surface perpendicular to the first direction;

first and second side surfaces each extending in the first direction and in a second direction perpendicular to the first direction and positioned on mutually opposite sides; and third and fourth side surfaces each extending in the first direction and in a third direction perpendicular to the first and second directions and positioned on mutually opposite sides, wherein the first terminal electrode is exposed to the mounting surface and a corner portion between the first and third side surfaces, wherein the second terminal electrode is exposed to the mounting surface and a corner portion between the first and fourth side surfaces, wherein the third terminal electrode is exposed to the mounting surface and a corner portion between the second and third side surfaces, wherein the fourth terminal electrode is exposed to the mounting surface and a corner portion between the second and fourth side surfaces, wherein the first conductor layer includes a spirally wound first coil pattern connected to the first terminal electrode, wherein the second conductor layer includes a spirally wound second coil pattern connected to the second terminal electrode, wherein the third conductor layer includes a spirally wound third coil pattern connected to the third terminal electrode, wherein the fourth conductor layer includes a spirally wound fourth coil pattern connected to the fourth terminal electrode, and wherein the first conductor layer further includes a first dummy pattern arranged between an outermost turn of the first coil pattern and the first side surface, and wherein the first dummy pattern overlaps with an outermost turn of the second coil pattern in the first direction.

8. The electronic component as claimed in claim 7, wherein the first dummy pattern includes a first protruding part protruding in the third direction toward the first side surface.

9. The electronic component as claimed in claim 7, wherein the first dummy pattern is isolated from the first coil pattern such that the first dummy pattern is in an electrically floating state.

10. The electronic component as claimed in claim 7, wherein the first conductor layer further includes a second dummy pattern arranged between the outermost turn of the first coil pattern and the second side surface.

11. The electronic component as claimed in claim 10, wherein the second dummy pattern includes a second protruding part protruding in the third direction toward the second side surface.

12. The electronic component as claimed in claim 7, wherein the third conductor layer further includes a third dummy pattern arranged between an outermost turn of the third coil pattern and the second side surface.

13. The electronic component as claimed in claim 12, wherein the third dummy pattern overlaps with an outermost turn of the fourth coil pattern in the first direction.

14. The electronic component as claimed in claim 7, wherein each of the first, second, third, and fourth conductor layers includes:

a first connection pattern connected to the first terminal electrode;

a second connection pattern connected to the second terminal electrode;

a third connection pattern connected to the third terminal electrode; and a fourth connection pattern connected to the fourth terminal electrode, wherein the first connection pattern is exposed to the third side surface without being exposed to the first side surface, wherein the second connection pattern is exposed to the fourth side surface without being exposed to the first side surface, wherein the third connection pattern is exposed to the third side surface without being exposed to the second side surface, and wherein the fourth connection pattern is exposed to the fourth side surface without being exposed to the second side surface.

15. The electronic component as claimed in claim 14, wherein each of the first and second side surface is free from the conductor layers.

16. The electronic component as claimed in claim 14, wherein a width in the third direction of the first connection pattern exposed to the third side surface is smaller than a width in the third direction of the first terminal electrode exposed to the third side surface, wherein a width in the third direction of the second connection pattern exposed to the fourth side surface is smaller than a width in the third direction of the second terminal electrode exposed to the fourth side surface, wherein a width in the third direction of the third connection pattern exposed to the third side surface is smaller than a width in the third direction of the third terminal electrode exposed to the third side surface, and wherein a width in the third direction of the fourth connection pattern exposed to the fourth side surface is smaller than a width in the third direction of the fourth terminal electrode exposed to the fourth side surface.

* * * * *